United States Patent [19]
Niles et al.

[11] 3,869,544
[45] Mar. 4, 1975

[54] STABILIZATION OF ALUMINUM HYDRIDE
[75] Inventors: Earl Thomas Niles, Midland;
Beverly A. H. Seaman, Midland County; Edwin J. Wilson, Midland, all of Mich.
[73] Assignee: The Dow Chemical Company, Midland, Mich.
[22] Filed: June 24, 1968
[21] Appl. No.: 740,830

[52] U.S. Cl. ............ 423/645, 423/644, 149/97
[51] Int. Cl. ........ C016 6/34, C01b 6/00, C01f 1/00, C01f 3/00, C01f 7/00
[58] Field of Search ............. 23/204, 365; 260/448; 423/645, 644, 122, 123, 124

[56] References Cited
UNITED STATES PATENTS
2,826,598   3/1958   Ziegler et al. ..................... 260/448
3,405,130   10/1968   Hogsett et al. .................... 260/448
3,417,119   12/1968   Ehrlich ............................. 260/448

OTHER PUBLICATIONS
Rice et al., Non-Soluated Aluminum Hydride AD. No. 106967 (Astia), 8/56, pp. 1-5.

Primary Examiner—Leland A. Sebastian
Assistant Examiner—R. E. Schafer
Attorney, Agent, or Firm—C. Kenneth Bjork

[57] ABSTRACT

The invention is a process for upgrading the thermostability of light metal hydrides, particularly substantially non-solvated, crystalline aluminum hydrides by contacting the hydride with an organic treating liquid having a small amount of water associated therewith at a maximum temperature of about 80° C., preferably at from about 40° to about 70° C., for a period of time and separating the so-treated product from the treating liquid.

10 Claims, No Drawings

STABILIZATION OF ALUMINUM HYDRIDE

BACKGROUND OF THE INVENTION

The invention herein described was made in the course of or under a contract or subcontract thereunder, with the Department of the Air Force.

This invention is concerned with the stabilization of light metal hydrides and more particularly is concerned with a novel process for improving the thermostability of substantially non-solvated crystalline aluminum hydrides.

Light metal hydrides, e.g. substantially non-solvated, crystalline aluminum trihydrides, find utility as fuel components in solid and hybrid rocket propulsion systems, as gas generators and in other similar operations. In particular, a substantially non-solvated, ether insoluble, crystalline aluminum hydride (hereinafter referred to as alpha-aluminum hydride) having a hexagonal crystal structure, a specific well-defined X-ray diffraction pattern and a density of over 1.4 grams per cubic centimeter has been found to be an especially desirable fuel for solid rocket propulsion systems. This compound has been disclosed in application Ser. No. 179,509 by Normal E. Matzek and Donald F. Musinski. However, at temperatures above about 60° C. this material both during storage and when used in a propellant grain tends to undergo detrimental spontaneous decomposition with time, liberating gaseous hydrogen. Additionally, it has been found that to a certain degree undesirable decomposition may occur with long term storage at ambient temperature, i.e. from about 18° to about 25° C., for example.

Some increase in the thermostability of this and other non-solvated aluminum hydride materials has been realized by coating the surface of these compounds with either an inert coating material or with materials which react with aluminum hydride to give a relatively inert surface layer. Examples of such materials are nitrogen oxide, $N_2F_4$, oxygen, carbon dioxide, volatile inorganic chlorides, volatile inorganic sulfides, triethylene glycol dinitrate, diphenylacetylene and carbon tetrachloride.

It also has been found that by incorporating magnesuim values in an amount of at least about 0.1 weight per cent, and usually from about 0.1 to about 3 or more weight per cent, based on the weight of the light metal hydride, into the crystal lattice of the light metal hydride, the thermostability of the resulting light metal hydride composition is markedly increased over that shown by the non-magnesium containing product. This improved stability particularly is shown with substantially non-solvated, crystalline aluminum hydride having from 0.4 to about 2 weight per cent magnesium incorporated into the lattice.

Ordinarily, preparation of this latter product is achieved by adding a finely divided magnesium source material, usually a substantially anhydrous magnesium salt, magnesium organometallic or a binary magnesium hydride or complex magnesium hydride, directly to a reaction mixture during the preparation of the light metal hydride. This assures that the magnesium is quite uniformly dispersed throughout the lattice in the resulting stabilized product.

In a preferred embodiment for preparing a substantially non-solvated, crystalline aluminum hydride having magnesium in the crystal lattice, a magnesium halide, e.g. magnesium chloride, and a liquid aromatic hydrocarbon, e.g. benzene, which is miscible with ether are introduced into and mixed with agitation in a reaction mixture of aluminum chloride and alkali metal aluminum hydride, e.g. $LiAlH_4$ or $NaAlH_4$ in ether, e.g. diethyl ether, used to prepare aluminum hydride. Ordinarily, the lithium aluminum hydride-aluminum chloride reactants range in a gram mole ratio of 3 to 4 ($LiAlH_4/AlCl_3$) based on that required stoichiometrically for aluminum hydride formation. Following the reaction period, ether is removed from the produce mixture by heating at a temperature of from about 40° to about 140° C., ordinarily in the presence of a complex borohydride such as lithium borohydride, sodium borohydride or excess of the alkali metal aluminum hydride, thereby to provide a crystalline, substantially non-solvated aluminum hydride containing a predetermined amount of magnesium. Generally, the amount of complex hydride used is such that there is from about 174 to about 1 mole of the complex hydride present for each mole of aluminum hydride product.

Substantially non-solvated large-sized, particulate, crystalline alpha-aluminum hydride particles ranging from about 10 to about 50 microns or larger form directly in the reaction solution if the temperature is maintained at from about 50° to about 85° C. and preferably at from about 60° to about 80° C., and most desirably at about 75°–77° C. This result is unexpected in view of the fact that the product obtained from the same solutions at lower temperatures is substantially completely solvated and of undesirably small sized, e.g. sub-micron particles.

In carrying out this process with low boiling ether solvents the desired crystallization temperatures are obtained by controllably increasing the pressure on the solution while heating thereby to raise the effective boiling point of the solution and give a predetermined reaction temperature. Alternatively, and preferably, an ether solution of aluminum hydride is introduced into an inert organic liquid having a higher boiling point than the ether, and preferably above about 80° C., to provide a solution having a normal boiling point of at least 50° C. This eliminates the need for use of superatmospheric pressure. Liquid hydrocarbons, preferably having a boiling point of above 80° C., such as for example, benzene, toluene, biphenyl, xylene, biphenyl benzene, decane and the like have been found to be particularly suitable.

Usually, in the preparation of the magnesium containing product, finely divided, substantially anhydrous magnesium source material, is added to an agitated reaction mixture. The resultant mix is stirred or otherwise agitated for a period of at least about 3 minutes, ordinarily from about 5 minutes to about 1.5 hours or more and usually from about 10 minutes to about 1 hour.

The temperatures employed are not critical, the process being operable at temperatures normally employed in light metal hydride preparation.

By eliminating the magnesium value containing reactant from the reaction mixture, this method produces alpha-aluminum hydride.

Additionally, it has been found that the thermostability of non-solvated, crystalline aluminum hydrides and such aluminum hydrides having magnesium values incorporated into the crystal lattice can be still further markedly improved over that realized heretofore if the resulting crystalline aluminum hydride product material is maintained at a maximum temperature of about 0° C. for a period of at least about 4 months prior to use, and preferably is stored at a maximum temperature of about minus 5° C., ordinarily at least at about minus 15° C., and usually is at from about minus 15° C. to about minus 200° C. under a substantially inert atmosphere for a period of at least about 6 months or more prior to use. In general, within the disclosed temperature range, as the storage time increases, the thermal stability also increases.

For optimum enhancement in thermal stability by this cold temperature storage, it has been found that the aluminum hydride should be placed in the requisite low temperature atmosphere promptly after manufacture as materials which have been stored at ambient temperature for a period of time usually undergo some deterioration and autodecomposition and upon subjection to elevated temperature many times exhibit a decreased thermal stability.

Atmospheres particularly suitable for use in the cold temperature-long term storage process are nitrogen, argon, hydrogen, helium and the like which do not react with or attack the crystalline, substantially non-solvated aluminum hydride product. Generally, the atmosphere used is substantially anhydrous; however, no detrimental effect on subsequent thermostability of the aluminum hydride product is found on samples subjected to low temperature wherein the atmosphere contains water or water vapor such that up to about 2 per cent hydrolysis of the aluminum hydride occurs.

In still another process the thermostabilization of such aluminum hydride materials is obtained by incorporated small quantities of an alkyl or ary substituted silicol, i.e. a silicoalkyl- or silicoaryl compound into the product. In this process an alkyl or aryl substituted silicol is incorporated into the lattice of the aluminum hydride to provide in the substantially non-solvated, crystalline aluminum hydride product a molar ratio of silicol/aluminum hydride of from about 0.2 to about 0.001, ordinarily from about 0.1 to about 0.005. This is achieved by following the general preparation set forth hereinbefore for alpha-aluminum hydride or magnesium containing alpha-aluminum hydride.

Each of the hereinbefore listed processes or techniques has been found to increase the thermostabilization of aluminum hydride to some degree over that shown by the base material itself. However, some of these, to be effective, must be utilized or employed directly during the preparation of the aluminum hydride and cannot be applied to a product which has been stored.

It is a principal object of the present invention to provide a novel process for increasing the thermostabilization of a substantially non-solvated crystalline aluminum hydride which gives an unexpectedly large increase in stabilization of the product.

It is another object of the present invention to provide a simple process for treating aluminum hydride either with or without magnesium or other moieties in the crystal lattice to provide markedly increased resistance to thermodegradation and whereby the resistance to autodecomposition or degradation at ambient room temperature is enhanced for extended periods of time.

It is also an object of the present invention to provide a process for increasing the thermostability of aluminum hydride which can be employed both on freshly prepared material as well as on aluminum hydride products that have been stored prior to treatment.

It is a further object of the present invention to provide a process for incresing the resistance of crystalline substantially non-solvated aluminum hydride products to thermal degradation wherein the agent or material employed in the process is removed after the treatment.

These and other objects and advantages of the present invention readily will become apparent from the detailed description presented herein.

SUMMARY OF THE INVENTION

In general the present process comprises contacting at a temperature of from about room temperature, i.e. ~18° to 25° C., to about 80° C., for a period of at least about 24 hours a substantially non-solvated aluminum hydride with a treating liquid from the group consisting of hydrazine, alkylhydrazines, alkylamines, hydrocarbons, or alcohols having a normal boiling point of from about 60° to about 100° C. and wherein the treating liquid has associated therewith at least about 0.1 weight per cent water. It is a further criterium of operation that the treating liquid release its water to the hydride over a period of time and not all at once upon initial contact. The so-treated aluminum hydride is separated from the treating liquid and dried. Usually, the product is washed with a fresh portion of the treating liquid prior to drying. The drying itself preferably is carried out by filtering, decanting or centrifuging in an inert atmosphere to remove the bulk of the treating liquid or wash liquid followed by subjecting the solid product to a low pressure to remove the last traces of liquid therefrom.

Examples of typical operable treating liquids for use in the present process are n-butylamine, isobutylamine, ethylenedihydrazine, hydrazine, benzene, ethyl alcohol, tributylamine, triethanolamine, diisopropylamine, and the like.

DESCRIPTION OF A PREFERRED EMBODIMENT

In a preferred embodiment of the present invention a particulate, substantially non-ether solvated, crystalline alpha-aluminum hydride or an alpha-aluminum hydride having magnesium values incorporated into the crystal lattice is contacted at a temperature of from about 40° to about 70° C. at atmospheric pressure for a period of from about 24 hours to 20 days or more, usually from about 6 days to about 20 days, with a treating liquid selected from the group consisting of hydrazine, alkylhydrazines and alkylamines wherein the treating liquid has from about 0.4 to about 3 or more weight per cent water associated therewith. Ordinarily the alkyl groups in the alkylhydrazine and alkylamine treating liquids contain from about 1 to about 4 carbon atoms.

Following the treatment step, the solid aluminum hydride is separated from the residual liquid, ordinarily by decantation of liquid, filtration or centrifuging and dried. Ordinarily the separation is carried out under an inert atmosphere, e.g. argon or nitrogen, but use of such a medium is not critical.

The aluminum hydride product is dried, as by passing a stream of dry gas, e.g. nitrogen, usually at about room temperature therethrough followed by a final drying under a low absolute pressure, e.g. about a maximum of 0.1 millimeter mercury absolute. Ordinarily, this latter step is carried out at from about room temperature up to about 90° C. or more. At the higher temperatures, the drying is completed in a short time, e.g. within an hour, to assure no detrimental degradation of the product.

The relative quantities of treating liquid and particulate aluminum hydride to be employed are not critical. It is only necessary that there be sufficient liquid or vapor present to at least completely contact the hydride. In actual practice it has been found that treating liquid weight:aluminum hydride weight proportions of from about 1:99 to about 95:5, and preferably of from about 30:70 to about 75:25, are quite satisfactory.

The residual treating liquid can be recovered, its water content adjusted, if necessary, and this be reused for additional treatment if desired.

The present novel process can be carried out in batch, cyclic batch or continuous operations.

The following Example will serve to further illustrate the present invention but is not meant to limit it thereto.

EXAMPLE

Preparation of Crystalline Aluminum Hydride Materials

Alpha-aluminum hydride and magnesium containing alpha-aluminum hydride products were prepared by the following general procedure.

A solution of aluminum hydride was prepared by mixing at room temperature about a 1 molar diethyl ether solution of aluminum chloride ($AlCl_3$) and about a 1 molar diethyl ether solution of lithium aluminum hydride ($LiAlH_4$) to provide a $LiAlH_4/AlCl_3$ ratio in the resulting reaction mixture, on a gram mole basis, of about 4. The mixture was filtered, to remove precipitated lithium chloride therefrom, into about a 1 molar diethyl ether solution of lithium borohydride.

At this stage of the process, for those preparations wherein magnesium was to be incorporated into the crystal lattice of the aluminum hydride product, ground magnesium chloride was added to the reaction mixture. Generally this additament was employed in an amount calculated to provide about 2 weight per cent magnesium in the final product.

Benzene in an amount to produce a solution containing about 30 volume per cent ether was added to the reaction mass in both preparations.

The resulting mixture was stirred for about 20 minutes, filtered into a reaction flask and the reaction flask connected to a distillation column. The reaction flask with the product solution was heated with controlled ether removal, if needed, to provide a final reflux temperature of about 76°–77° C. The reaction mass was heated under total reflux at this temperature for a period of from about 1 to about 2.5 hours. White crystalline particles formed in the reactor during the reflux. These particles continued to grow in size during the reflux period. Following the reflux operation, the reaction vessel containing the white crystalline product was removed from the distillation column, the solid product separated by filtering, and, washed with diethyl ether. The so-recovered particulate aluminum hydride materials were dried at ambient temperature, i.e. ~18°–25° C., under a pressure of about $1 \times 10^{-3}$ millimeter mercury absolute.

All manipulative and operating procedures were carried out in the presence of a substantially anhydrous nitrogen atmosphere and all reactants, solvents and liquid carriers were substantially moisture-free.

Unit cell dimensions for a sample of the magnesium containing product as calculated from an X-ray powder diffraction pattern of the hexagonal crystal structure product material were found to be $a = 4.453A$, $C = 5.916_5A$.

The unit cell dimensions calculated for an aluminum hydride product prepared by the same procedure, except that no magnesium values had been incorporated into the crystal lattice structure, were $a = 4.450_2A$, $C = 5.906_6A$. These are consistent for alpha-aluminum hydride. The increase in lattice constants for the magnesium containing product indicates the magnesium values are incorporated into the hexagonal crystal lattice structure of the aluminum hydride thereby giving an expanded unit cell.

Stabilization of Crystalline Aluminum Hydride a. About 40 parts by weight of an alpha-aluminum hydride having about 1 per cent magnesium incorporated into the crystal lattice was slurried with about 60 parts by weight of a treating liquid having a predetermined quantity of water associated therewith. The slurry was heated to about 60° C. and maintained at this temperature at about atmospheric pressure for a predetermined period of time. Following the treating period, the product mixture was cooled to room temperature and the treating liquid decanted from the solid product. The product was washed with about 60 parts by weight of fresh treating liquid, filtered and dried at a maximum absolute pressure of about 0.1 millimeter mercury at room temperature, i.e. about 18°–25° C.

In the majority of these preparations, aluminum hydride weights of about 4 to 10 grams were employed although in some instances about 0.75 pound samples were used.

The treated aluminum hydride was stored at a temperature of about 60° C., either alone or in admixture with hydrazine, and the thermal stability, i.e. gassing equivalent to one per cent decomposition at test temperature, as measured using a standard taliani test apparatus, was determined. For use in propellant applications, the standard of acceptance is that there can be no greater than 1 per cent decomposition in 10 days (240 hours) when stored at 60° C. The tests run in hydrazine were carried out to determine the compatibility of the treated material and hydrazine which is a known liquid fuel component.

Additionally, elemental chemical analyses were run on the original aluminum hydride and the products stabilized by treatment for predetermined time periods in accordance with the present novel process.

Table I summarizes the results of the analytical studies.

Table II shows the time for the aluminum hydride material to reach one per cent decomposition at 60° C. when admixed with hydrazine liquid propellant fuel and the time to reach 0.5 per cent decomposition when tested alone.

The sample numbers presented in Table II correspond to the same samples of Table I.

Table I

| Sample No | Treating Liquid | Treating Time (days) | Water in Treating Liquid (Wt. %) | Elemental Analysis (Weight percent) | | | | | | |
|---|---|---|---|---|---|---|---|---|---|---|
| | | | | O[1] | C | H | N | Mg | Li | Cl |
| 1 | (As received — Control) | | | 0.33 | 0.15 | 9.92 | 0.18 | 1.18 | 0.23 | 0.08 |
| 2 | hydrazine | 18 | 0.8 | 1.22 | 0.20 | 9.84 | 0.30 | 1.18 | 0.17 | <0.05 |
| 3[2] | do | 6 | 0.8 | 1.04 | 0.20 | 9.85 | 0.30 | 1.17 | 0.19 | <0.05 |
| 4 | benzene | 6 | 0.8 | 1.74 | 0.20 | 9.77 | 0.19 | 1.15 | 0.22 | 0.13 |
| 5 | do | do | 3.2 | 3.86 | 0.10 | 9.46 | 0.38 | 1.10 | 0.21 | 0.13 |
| 6 | ethanol | 6 | 0.46 | 0.87 | 0.20 | 9.98 | 0.38 | 1.15 | 0.20 | <0.05 |
| 7 | do | do | 1.46 | 1.30 | 0.40 | 10.04 | 0.20 | 1.17 | 0.21 | 0.08 |
| 8 | iso-butylamine | 6 | 1.51 | 1.14 | 0.25 | 9.78 | 0.30 | 1.13 | 0.23 | 0.12 |
| 9 | n-butylamine | 6 | 2.08 | 2.84 | 0.37 | 9.58 | 0.40 | 1.10 | 0.20 | 0.06 |
| 10 | do | 18 | 2.08 | 1.54 | 0.45 | 9.76 | 0.40 | 1.09 | 0.22 | 0.09 |
| 11 | do | 6 | do | 1.58 | 0.30 | 9.86 | 0.24 | 1.18 | 0.22 | 0.10 |
| 12 | do | do | 1.81 | 1.26 | 0.30 | 9.87 | 0.06 | 1.23 | 0.24 | 0.12 |
| 13 | do | do | 1.81 | 0.92 | 0.20 | 9.83 | 0.18 | 1.20 | 0.22 | 0.09 |
| 14[3] | n-butylamine | 17 | 1.81 | 0.89 | 0.30 | 9.75 | 0.60 | 0.97 | 0.17 | 0.05 |
| 15[3] | do | 9 | ~2 | 1.32 | 0.43 | 9.81 | 0.13 | 0.94 | 0.19 | 0.05 |
| 16[3] | do | 17 | ~2 | 1.74 | 0.36 | 9.74 | 0.12 | 0.92 | 0.19 | 0.04 |
| 17 | ethylene dihydrazine | 6 | ~1 | 1.77 | 0.40 | 9.81 | 0.12 | 1.24 | 0.21 | 0.04 |

[1] neutron activation analysis
[2] treating liquid weight aluminum hydride weight proportion 120/40
[3] 0.75 lb aluminum hydride sample weight Table II

| Sample No. | Sample Suspended in Propellant Grade Hydrazine Time to Reach 1% Decomposition at 60°C. (hours) | Sample Tested Alone Time to Reach 0.5% Decomposition at 60°C. (hours) |
|---|---|---|
| 1 Control | 520 | 225 |
| 2 | 1090 | 710 |
| 3 | 595 | 400 |
| 4 | 745 | 620 |
| 5 | 705 | >900 |
| 6 | 880 | 420 |
| 7 | 970 | 550 |
| 8 | 1600 | —[1] |
| 9 | ~1450 | 550 |
| 10 | 3900 | 1010 |
| 11 | 1370 | 650 |
| 12 | 1835 | 520 |
| 13 | 955 | 410 |
| 14 | 3570 | 575 |
| 15 | 765 | 505 |
| 16 | 1425 | 665 |
| 17 | 625 | —[1] |

[1] not tested b. Double base solid propellants were fabricated employing on a weight basis 25 per cent hexagonal crystalline non-ether solvated aluminum hydride having magnesium values incorporated into the crystal lattice, 26 per cent ammonium perchlorate, 12 per cent plastisol grade nitrocellulose, 26.2 per cent nitroglycerine, 4.4 per cent triethylene glycol dinitrate, 4.4 per cent bis(2,2-dinitropropyl)acetal, 1 per cent 2-nitrodiphenylamine and 1 per cent resorcinol.

The ingredients were blended until substantially homogeneous, cast directly into a Taliani tube and cured at the test temperature of 60° C.

In this study, crystalline magnesium containing aluminum hydride, as received (elemental analysis on a weight bases: O—0.43%, C—0.86%, H—9.97%, Mg—1.14%, Li—0.19%, Cl—0.09%) was used to prepare a control propellant. The n-butylamine treated material employed in Run No. 14 of study (a) described directly hereinbefore was employed as the treated product resulting from the process of the present invention.

The resulting propellants were stored at 60° C. and the gas liberated was measured using a standard Taliani test apparatus.

The control propellant exhibited gassing equivalent to 1 per cent decomposition after about 13.5 days storage at 60° C.

The propellant containing the n-butylamine treated aluminum hydride took 60 days to reach this same level of decomposition.

Various modifications can be made in the present invention without departing from the spirit or scope thereof for it is understood that we limit ourselves only as defined in the appended claims.

We claim:

1. A process for increasing the thermostability of a substantially non-solvated aluminum hydride which comprises;
   a. contacting at a temperature of from about 25° C. to about 80° C. for a period of at least about 24 hours a substantially non-solvated aluminum hydride with a treating liquid selected from the group consisting of hydrazine, alkylhydrazines, alkylamines, hydrocarbons or alcohols wherein the treating liquid has associated therewith at least about 0.1 weight per cent water,
   b. separating the so-treated aluminum hydride product from the treating liquid, and
   c. drying said aluminum hydride product.

2. The process as defined in claim 1 wherein the temperature of contact of said aluminum hydride and said treating liquid is from about 40° to about 70° C., and said treating liquid has from about 0.4 to about 3 per cent by weight water associated therewith.

3. The process as defined in claim 1 wherein the treating liquid has a normal boiling point of from about 60° to about 100° C.

4. The process as defined in claim 1 wherein the weight proportions of said treating liquid:aluminum hydride range from about 1:99 to about 95:5.

5. The process as defined in claim 1 wherein the treating liquid is a member selected from the group consisting of hydrazine, alkylhydrazines and alkylamines, the alkyl groups of said alkylhydrazines and alkylamines containing from one to about four carbon atoms.

6. The process as defined in claim 1 wherein the aluminum hydride and treating liquid are maintained in contact for a period of from about 6 to about 20 days.

7. The process as defined in claim 1 wherein the aluminum hydride is a substantially non-solvated hexagonal, crystalline aluminum hydride.

8. The process as defined in claim 1 wherein the aluminum hydride is a substantially non-solvated, hexagonal crystalline aluminum hydride having from about 0.1 to about 3 weight per cent of magnesium incorporated into its crystal lattice.

9. The process as defined in claim 2 wherein the treating liquid is a member selected from the group consisting of n-butylamine, hydrazine, benzene, ethanol, iso-butylamine and ethylenedihydrazine.

10. The process as defined in claim 2 wherein the weight proportions of said treating liquid:aluminum hydride ranges from about 30:70 to about 75:25.

* * * * *